(12) United States Patent
Ogura

(10) Patent No.: US 12,289,434 B2
(45) Date of Patent: Apr. 29, 2025

(54) INFORMATION PROCESSING APPARATUS, DISPLAY RANGE DECISION METHOD, AND PROGRAM FOR DECIDING A DISPLAY RANGE OF A SWITCHING DESTINATION VIEWPOINT IMAGE

(71) Applicant: SONY GROUP CORPORATION, Tokyo (JP)

(72) Inventor: Sho Ogura, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 237 days.

(21) Appl. No.: 17/923,143

(22) PCT Filed: May 12, 2021

(86) PCT No.: PCT/JP2021/018045
§ 371 (c)(1),
(2) Date: Nov. 3, 2022

(87) PCT Pub. No.: WO2021/261099
PCT Pub. Date: Dec. 30, 2021

(65) Prior Publication Data
US 2023/0224449 A1 Jul. 13, 2023

(30) Foreign Application Priority Data
Jun. 23, 2020 (JP) .................. 2020-107995

(51) Int. Cl.
*G06F 3/01* (2006.01)
*G06T 7/70* (2017.01)
(Continued)

(52) U.S. Cl.
CPC .......... *H04N 13/282* (2018.05); *G06F 3/013* (2013.01); *G06T 7/70* (2017.01); *H04N 13/383* (2018.05)

(58) Field of Classification Search
None
See application file for complete search history.

(56) References Cited

U.S. PATENT DOCUMENTS

| 10,740,957 B1 * | 8/2020 | McElroy ............... A63F 13/355 |
| 2013/0014024 A1 * | 1/2013 | Sudo ..................... G16H 30/40 715/752 |

FOREIGN PATENT DOCUMENTS

| JP | 2010-124023 A | 6/2010 |
| JP | 2015-095801 A | 5/2015 |

(Continued)

*Primary Examiner* — Michael J Cobb
(74) *Attorney, Agent, or Firm* — Paratus Law Group, PLLC

(57) ABSTRACT

An information processing apparatus according to the present technology includes a display range decision unit configured, in switching a display image as to multiple-viewpoint images capable of displaying a display target from multiple viewpoints, from a switching source viewpoint image corresponding to a switching source viewpoint to a switching destination viewpoint image corresponding to a switching destination viewpoint, to decide a display range of the switching destination viewpoint image on the basis of viewpoint position information of the switching destination viewpoint, specific target information which is information regarding a specific target in the display target, and line-of-sight direction information of an estimated orientation of a line-of-sight of a user to the display image.

14 Claims, 8 Drawing Sheets

PATTERN 1

(51) Int. Cl.
*H04N 13/282* (2018.01)
*H04N 13/383* (2018.01)

(56) References Cited

FOREIGN PATENT DOCUMENTS

| | | |
|---|---|---|
| JP | 2018-092491 A | 6/2018 |
| JP | 2019-086578 A | 6/2019 |
| JP | 2019-149122 A | 9/2019 |
| WO | WO 2017/159063 A1 | 9/2017 |

* cited by examiner

PATTERN 1

PATTERN 2

PATTERN 3

CASE OF PATTERNS 1, 3

A

B

CASE OF PATTERN 2

INFORMATION PROCESSING APPARATUS, DISPLAY RANGE DECISION METHOD, AND PROGRAM FOR DECIDING A DISPLAY RANGE OF A SWITCHING DESTINATION VIEWPOINT IMAGE

CROSS REFERENCE TO PRIOR APPLICATION

This application is a National Stage Patent Application of PCT International Patent Application No. PCT/JP2021/018045 (filed on May 12, 2021) under 35 U.S.C. § 371, which claims priority to Japanese Patent Application No. 2020-107995 (filed on Jun. 23, 2020), which are all hereby incorporated by reference in their entirety.

TECHNICAL FIELD

The present technology relates to an information processing apparatus, a display range decision method, and a program that make a decision on a display range as an image range to be displayed to a user, from an image displaying a display target.

BACKGROUND ART

For example, in a display device such as a head mounted display (HMD), an image display range has been controlled in accordance with a line-of-sight direction of a user to be estimated from an orientation of the user's head, and the like. For example, in displaying a wide-angle image such as a panoramic image, a display range in the wide-angle image is changed following a change in line-of-sight direction of a user.

In addition, some display devices have an image viewpoint switching function. That is, images respectively viewed from multiple viewpoints are displayed to a user while being switched.

Note that Patent Document 1 listed below can be cited as the related conventional technology. Patent Document 1 listed below discloses a technology for switching a virtual viewpoint in a virtual viewpoint image.

CITATION LIST

Patent Document

Patent Document 1: Japanese Patent Application Laid-Open Publication No. 2018-92491

SUMMARY OF THE INVENTION

Problems to be Solved by the Invention

Here, consideration will be given to a case where a display device, such as an HMD, that controls an image display range in accordance with a line-of-sight direction of a user has a viewpoint switching function. In combining display range control according to a line-of-sight direction with viewpoint switching, there is a possibility that a user may feel a sense of incongruity owing to the viewpoint switching unless an image display range after the viewpoint switching is controlled appropriately.

The present technology has been made in view of the circumstances described above and aims to cause a user to less feel a sense of incongruity owing to viewpoint switching.

Solutions to Problems

An information processing apparatus according to the present technology includes a display range decision unit configured, in switching a display image as to multiple-viewpoint images capable of displaying a display target from multiple viewpoints, from a switching source viewpoint image corresponding to a switching source viewpoint to a switching destination viewpoint image corresponding to a switching destination viewpoint, to decide a display range of the switching destination viewpoint image on the basis of viewpoint position information of the switching destination viewpoint, specific target information which is information regarding a specific target in the display target, and line-of-sight direction information of an estimated orientation of a line-of-sight of a user to the display image.

Here, if the display target is, for example, a target in a real space, a viewpoint to the display target is a viewpoint of a camera that captures an image of the target. Alternatively, if the display target is a target in a virtual space, a viewpoint to the display target is a viewpoint to the display target set on the virtual space. Moreover, the specific target information is information regarding the specific target in the display target. For example, if the display target is a music live show or the like in a real space, the specific target information can be information of a position, posture, and orientation of a specific object such as an artist on a stage, information of a position of a specific space in the display target, such as the center of the stage, and the like, as examples.

According to the foregoing configuration, in a case where a display range of an image is controlled in accordance with a line-of-sight direction of a user, a display range of a switching destination viewpoint image can be decided on the basis of the relationship between a position of a switching destination viewpoint and a position and the like of a specific target in a display target.

The foregoing information processing apparatus according to the present technology can have a configuration in which the specific target information is information containing a position of the specific target.

With this configuration, it is possible to decide the display range of the switching destination viewpoint image on the basis of the relationship between the position of the switching destination viewpoint and the position of the specific target.

The foregoing information processing apparatus according to the present technology can have a configuration in which the position of the specific target is detected by image analysis.

With this configuration, it is possible to eliminate a necessity to attach a position detection sensor to the specific target in detecting the position of the specific target.

The foregoing information processing apparatus according to the present technology can have a configuration in which the position of the specific target is detected on the basis of a detection signal of a sensor attached to the specific target.

With this configuration, it is possible to eliminate a necessity to perform image analysis processing for detecting a position of the specific target.

The foregoing information processing apparatus according to the present technology can have a configuration in which the display range decision unit decides the display range, using information of a direction of a line-of-sight from the switching destination viewpoint.

With this configuration, it is possible to address a case where an observing direction from a viewpoint is changeable such as a case where an orientation of a camera that captures an image of the display target is changeable.

The foregoing information processing apparatus according to the present technology can have a configuration in which the display range decision unit decides the display range such that the specific target is displayed in a predetermined direction of a line-of-sight direction of the user.

With this configuration, after viewpoint switching, the user is able to see the specific target in the predetermined direction by directing his or her line-of-sight direction to the predetermined direction.

The foregoing information processing apparatus according to the present technology can have a configuration in which the display range decision unit decides the display range such that the specific target is displayed in a front direction of a line-of-sight direction of the user.

With this configuration, after the viewpoint switching, the user is able to see the specific target in front by directing his or her line-of-sight direction to the front direction.

The foregoing information processing apparatus according to the present technology can have a configuration in which the specific target is a specific space in the display target.

With this configuration, it is possible to decide the display range of the switching destination viewpoint image, using, for example, a space serving as an indication in the display target, such as the center of the stage, as the point of reference.

The foregoing information processing apparatus according to the present technology can have a configuration in which the display range decision unit decides the display range such that the specific target is displayed in a line-of-sight direction of the user at viewpoint switching.

With this configuration, after the viewpoint switching, the user is able to see the specific target in front while keeping the line-of-sight direction at the viewpoint switching.

The foregoing information processing apparatus according to the present technology can have a configuration in which the specific target is an object determined that the user has looked in the display image of the switching source viewpoint.

With this configuration, it is possible to decide the display range of the switching destination viewpoint image, using the object which the user has looked in the display image of the switching source viewpoint, as the point of reference.

The foregoing information processing apparatus according to the present technology can have a configuration in which the display range decision unit determines whether or not to make a decision on the display range using the viewpoint position information, the specific target information, and the line-of-sight direction information, on the basis of a type of the target which the user has looked in the display image of the switching source viewpoint.

With this configuration, it is possible to make an appropriate determination whether or not to make a display range decision using the viewpoint position information, the specific target information, and the line-of-sight direction information, on the basis of a type of the target which the user has looked. For example, when the user has looked a target outside the stage, such as a spectator seat portion, the display range decision unit determines not to make a display range decision using the foregoing three pieces of information.

The foregoing information processing apparatus according to the present technology can have a configuration in which in a case where it is determined that the user has looked the specific object in the display image of the switching source viewpoint, the display range decision unit makes a decision on the display range using the viewpoint position information, the specific target information, and the line-of-sight direction information.

With this configuration, in a case where the user has looked, for example, a target different from the specific object, such as a spectator seat portion, it is possible not to make a display range decision using the three pieces of information.

In addition, a display range decision method according to the present technology is a display range decision method including causing an information processing apparatus, in switching a display image as to multiple-viewpoint images capable of displaying a display target from multiple viewpoints, from a switching source viewpoint image corresponding to a switching source viewpoint to a switching destination viewpoint image corresponding to a switching destination viewpoint, to decide a display range of the switching destination viewpoint image on the basis of viewpoint position information of the switching destination viewpoint, specific target information which is information regarding a specific target in the display target, and line-of-sight direction information of an estimated orientation of a line-of-sight of a user to the display image.

Such a display range decision method also provides functional effects similar to those of the foregoing information processing apparatus according to the present technology.

Furthermore, a program according to the present technology is a computer apparatus-readable program for causing a computer apparatus to execute processing, in switching a display image as to multiple-viewpoint images capable of displaying a display target from multiple viewpoints, from a switching source viewpoint image corresponding to a switching source viewpoint to a switching destination viewpoint image corresponding to a switching destination viewpoint, of deciding a display range of the switching destination viewpoint image on the basis of viewpoint position information of the switching destination viewpoint, specific target information which is information regarding a specific target in the display target, and line-of-sight direction information of an estimated orientation of a line-of-sight of a user to the display image.

Such a program realizes the foregoing information processing apparatus according to the present technology.

MODE FOR CARRYING OUT THE INVENTION

With reference to the accompanying drawings, an embodiment according to the present technology will be described below in the following order.

<1. Display system as embodiment>
<2. Display range deciding technique as embodiment>
<3. Processing procedure>
<4. Modifications>
<5. Program>
<6. Summary of embodiment>
<7. The present technology>

1. Display System as Embodiment

Figure 1:
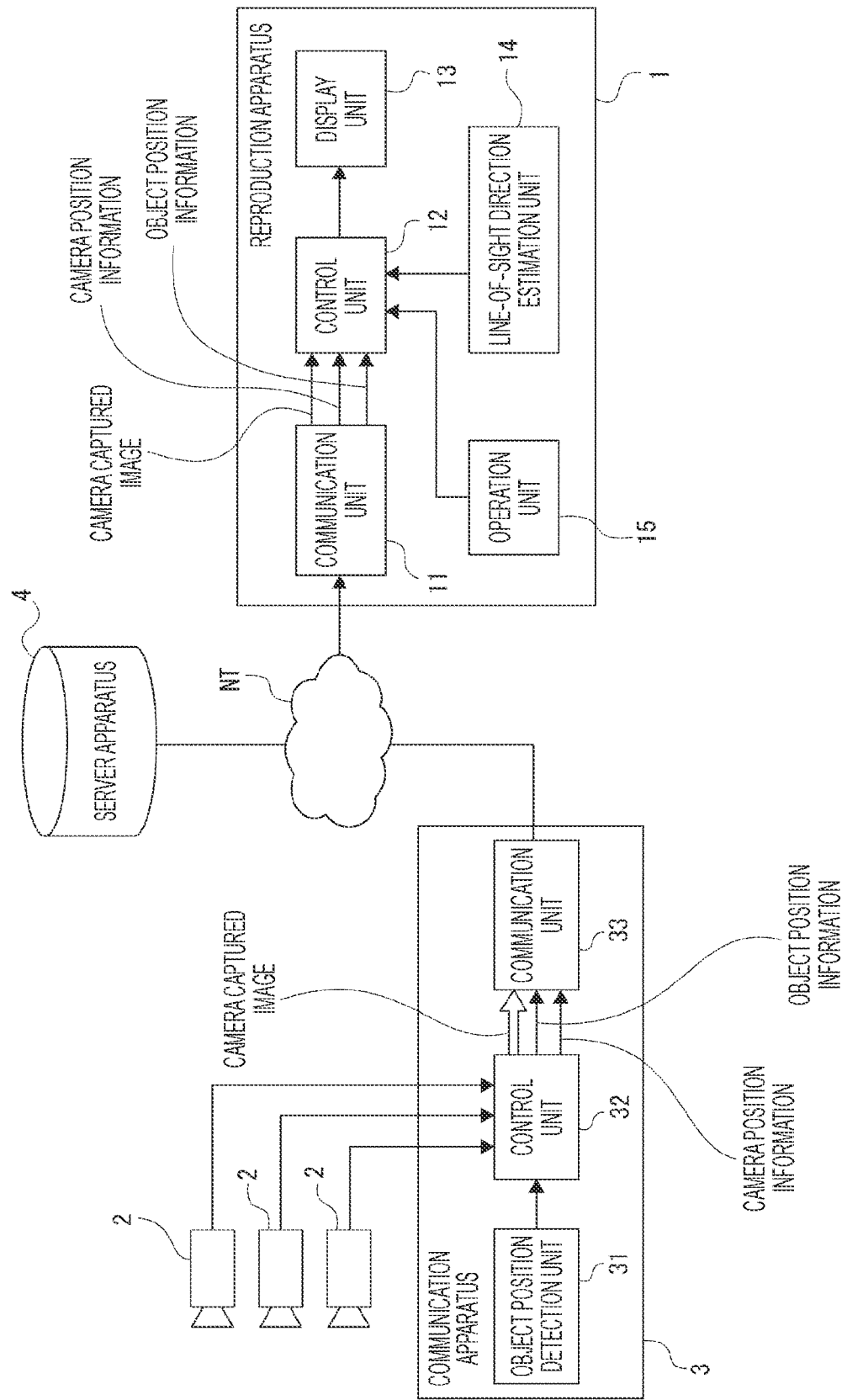
FIG. 1 is a diagram illustrating a configuration example of a display system including an information processing apparatus as an embodiment according to the present technology.

FIG. 1 illustrates a configuration example of a display system including a reproduction apparatus 1 which is one embodiment of an information processing apparatus according to the present technology.

As illustrated, the display system includes the reproduction apparatus 1, a plurality of cameras 2, a communication apparatus 3, and a server apparatus 4.

In the display system of the present example, images of a music live show performed in a real space are captured by the cameras 2 and are distributed as display contents to the reproduction apparatus 1. It is assumed particularly in the present example that the images as the display contents are distributed live. The reproduction apparatus 1 is, for example, a head mounted display (HMD) and is used in a state in which it is mounted to a user's head.

The captured images as the display contents are imported from the cameras 2 to the communication apparatus 3. Thereafter, the captured images are uploaded onto the server apparatus 4 and are distributed from the server apparatus 4 to the reproduction apparatus 1.

It can be said herein that, in the display system of the present example, a music live show, of which the images are to be captured by the respective cameras 2, is regarded as a target to be displayed as display contents to a user. In the present specification, a target to be displayed as display contents to a user is referred to as "a display target".

Each of the cameras 2 is, for example, an image capturing apparatus that includes an image capturing element such as a charge coupled device (CCD) image sensor or a complementary metal oxide semiconductor (CMOS) image sensor and captures images. The cameras 2 are placed at different positions to obtain captured images from different viewpoints, respectively, in a live venue.

Figure 2:
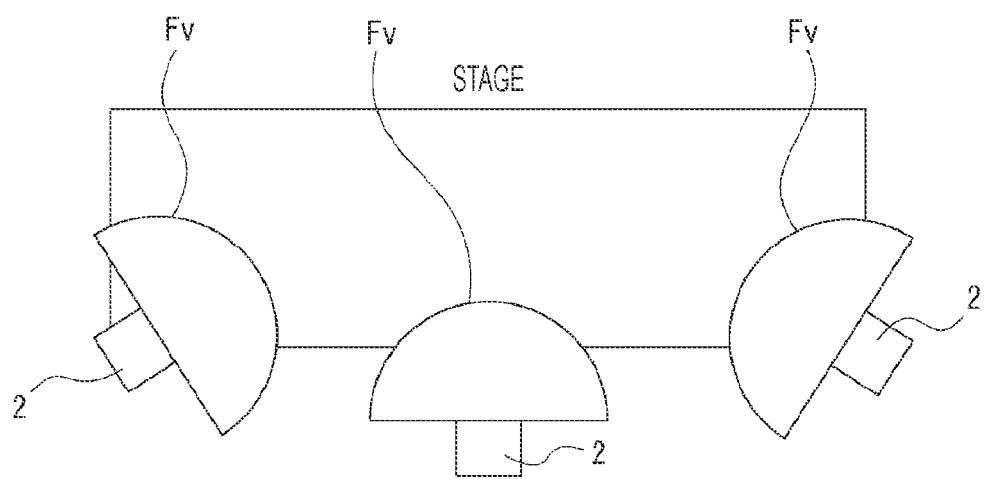
FIG. 2 is a diagram illustrating a layout example of cameras in the embodiment.

FIG. 2 illustrates a layout example of the cameras 2.

In the present example, a display target is a music live show and, as illustrated, the cameras 2 are placed to capture images of a stage from different positions, respectively. It is assumed in the present example that the cameras 2 are respectively placed at a position where the stage is observed from the front, a position where the stage is observed from the left side, and a position where the stage is observed from the right side.

In the figure, the field of view Fv of each camera 2 is schematically illustrated in conjunction with the position of the camera 2. It is assumed in the present example that the field of view Fv of each camera 2 is, for example, 180 degrees, which covers a relatively wide range. That is, it can be said that a camera captured image is a wide-angle image.

Note that the case where the number of cameras 2 is three is exemplified herein; however, it is sufficient that the number of cameras 2 is at least two or more.

The communication apparatus 3 includes an object position detection unit 31, a control unit 32, and a communication unit 33.

The object position detection unit 31 detects a position of a specific object in a display target. In the present example, specifically, the object position detection unit 31 detects a position of a person who is an artist performing a music live show.

A position of a specific object as an artist can be detected by various sensors. For example, a position of a specific object can be detected by image analysis on images captured by one or more cameras (image sensors) that are placed in a venue to capture images of the specific object. A position of a specific object can also be detected using a depth sensor. A position of a specific object as an artist can alternatively be detected on the basis of detection signals of physical sensors, such as acceleration sensors, gyro sensors, or global navigation satellite system (GNSS) sensors, attached to the specific object. Note that a position of a specific object can also be detected on the basis of both the image analysis and the detection signals of the physical sensors described above.

Hereinafter, information on a position of a specific object detected by the object position detection unit 31 is represented as "object position information".

The communication unit 33 establishes data communications with external equipment in a wired or wireless manner. The communication unit 33 of the present example establishes data communications with the server apparatus 4 via a network NT.

Here, a variety of examples is assumed as a configuration of the network NT. Examples of the configuration assumed herein may include, in addition to the Internet, an intranet, an extranet, a local area network (LAN), a community antenna television (CATV) communication network, a virtual private network (VPN), a telephone line network, a mobile communication network, a satellite communication network, and the like. A variety of examples is also assumed as to a transmission medium that constitutes a part of the network NT or the entire network NT. Examples of the transmission medium utilizable herein may include a wired transmission medium such as IEEE (abbreviation for institute of electrical and electronics engineers) 1394, a universal serial bus (USB), power line communication, or a telephone line, and a wireless transmission medium such as an infrared transmission medium like IrDA (abbreviation for infrared data association), Bluetooth (registered trademark), a 802.11 wireless network, a mobile phone network, a satellite line, and a digital terrestrial network.

The control unit 32 includes a microcomputer including a central processing unit (CPU) and memory apparatuses such as a read only memory (ROM) and a random access memory (RAM), and controls the entire communication apparatus 3. The control unit 32 particularly performs control for uploading images captured by the respective cameras 2 (camera captured images) and object position information detected by the object position detection unit 31, onto the server apparatus 4 via the communication unit 33.

The control unit 32 also performs control for uploading, in addition to these camera captured images and the object position information, camera position information which is information indicating the positions where the cameras 2 are placed, onto the server apparatus 4.

The reproduction apparatus 1 includes a communication unit 11, a control unit 12, a display unit 13, a line-of-sight direction estimation unit 14, and an operation unit 15.

The communication unit 11 establishes data communications with external equipment in a wired or wireless manner. Particularly in the present example, the communication unit 11 establishes data communications with the server apparatus 4 via the network NT.

The display unit 13 includes, for example, a display capable of image display, such as a liquid crystal display (LCD) or an organic electroluminescence (EL) display, and displays various kinds of information to the user on the basis of an instruction from the control unit 12.

The line-of-sight direction estimation unit 14 estimates the line-of-sight direction of the user.

Specifically, the line-of-sight direction estimation unit 14 of the present example includes a physical sensor, such as an acceleration sensor or a gyro sensor, that detects the motion of the user's head, and estimates a line-of-sight direction from a motion amount of the user's head.

Here, in a case where the user's head, to which the reproduction apparatus 1 as an HMD is attached, turns, for example, right from a direction defined as a front direction (a direction of 0 degrees), it can be considered that an orientation of the user's line-of-sight is changed to the right direction. The line-of-sight direction of the user can therefore be estimated from the motion amount of the head.

In the present specification, the term "line-of-sight direction" of a user does not strictly refer to only an orientation of the eyeballs (an orientation of pupils), but broadly involves an orientation indirectly estimated from, for example, the orientation of the user's head as described above.

The operation unit 15 includes, for example, input devices such as various hardware keys, an operation dial, and a touch panel, detects an input operation by the user, and sends the input operation to the control unit 12. The control unit 12 decides the operation of the reproduction apparatus 1 in accordance with the input operation by the user, and controls the respective units such that the respective units perform necessary operations.

The control unit 12 includes a microcomputer including a CPU and memory apparatuses such as a read only memory (ROM) and a random access memory (RAM), and controls the entire communication apparatus 3. The control unit 12 particularly performs processing related to display of a camera captured image to be distributed from the server apparatus 4.

Specifically, the control unit 12 performs, as the processing related to display of a camera captured image, processing of controlling a display range which is an image range to be displayed to the user through the display unit 13, of the entire range of the camera captured image, in accordance with the line-of-sight direction estimated by the line-of-sight direction estimation unit 14.

Figure 3:
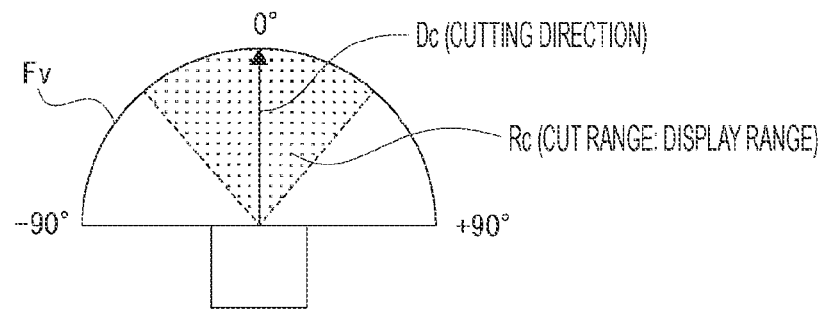
FIG. 3 is an explanatory diagram about display range control according to a line-of-sight direction.
Figure 3:
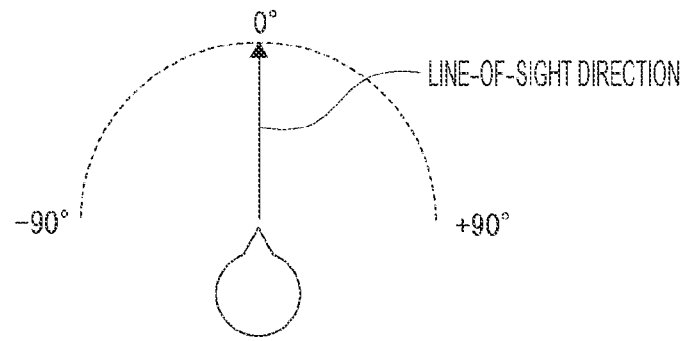
Figure 3:
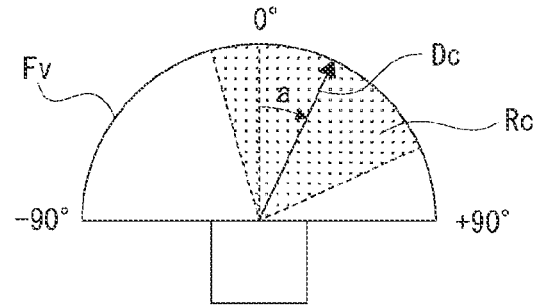
Figure 3:
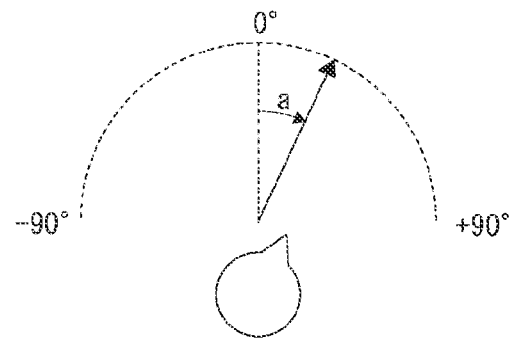

FIG. 3 is an explanatory diagram about such display range control according to a line-of-sight direction.

In the display range control according to the line-of-sight direction, the front direction defined as to the line-of-sight direction of the user and the front direction in the field of view Fv of each camera 2 are each used as the point of reference. Here, as illustrated in FIG. 3A, each of the front direction in the line-of-sight direction and the front direction in the field of view Fv is the direction of 0 degrees.

When the line-of-sight direction is the direction of 0 degrees as illustrated in FIG. 3A, a predetermined range about the direction of 0 degrees in the field of view Fv is cut from a camera captured image, as an image range to be displayed on the display unit 13. A range to be cut as a display target image range as described above is represented as "a cut range Rc".

In addition, a front direction in the cut range Rc (a center direction of a view angle) is represented as "a cutting direction Dc" as illustrated. It can be said that the cutting direction Dc is regarded a direction indicating the center of the image in the cut range Rc, that is, the display image.

In the display range control according to the line-of-sight direction, as described above, when the line-of-sight direction is the direction of 0 degrees, the predetermined range about the direction of 0 degrees in the field of view Fv is basically regarded as the display range. This is because it is difficult to consider that the user keeps looking the display image for long hours with his or her line-of-sight direction deviating from the front direction and, in many cases, it can be assumed that the user faces frontward.

Moreover, as exemplified in FIG. 3B, in a case where the line-of-sight direction of the user is changed, the cutting direction Dc is changed following the change of the line-of-sight direction. FIG. 3B illustrates the example of the line-of-sight direction that is changed rightward by an angle α from the direction of 0 degrees. In this case, the cutting direction Dc is also changed rightward by the angle α from the direction of 0 degrees.

The control to change the cutting direction Dc following the change of the line-of-sight direction as described above, in other words, the control to change the cut range Rc (the display range) following the change of the line-of-sight direction is represented as "line-of-sight following control" of a display range.

Here, with regard to the line-of-sight following control of the display range, the control to set the cutting direction Dc at the direction of 0 degrees in the field of view Fv particularly at the time when the line-of-sight direction is the direction of 0 degrees as described in the example illustrated in FIG. 3 is called "ordinary line-of-sight following control".

In FIG. 1, the control unit 12 also performs, as the control related to the display of the camera captured images, viewpoint switching control of the display image in conjunction with the foregoing line-of-sight following control of the display range. It can be said that the viewpoint switching control is regarded as control to switch an image to be displayed on the display unit 13, among the camera captured images by the respective cameras 2. Note that, in the viewpoint switching control, the control unit 12 may receive each of the camera captured images from the server apparatus 4 and select an image to be displayed on the display unit 13, from the received camera captured images. Alternatively, the control unit 12 may selectively receive only a camera captured image by one of the cameras 2 serving as a switching destination viewpoint from the server apparatus 4 and display the received image on the display unit 13.

Moreover, the control unit 12 occasionally performs control different from the ordinary viewpoint following control, as the viewpoint following control for the camera captured image of the switching destination viewpoint, in accordance with viewpoint switching. This control will be described later.

2. Display Range Deciding Technique as Embodiment

First, consideration will be given to a display range deciding technique after the viewpoint switching while referring to FIG. 4.

It is assumed herein that the ordinary line-of-sight following control is performed as the line-of-sight following control of the display range.

Figure 4:
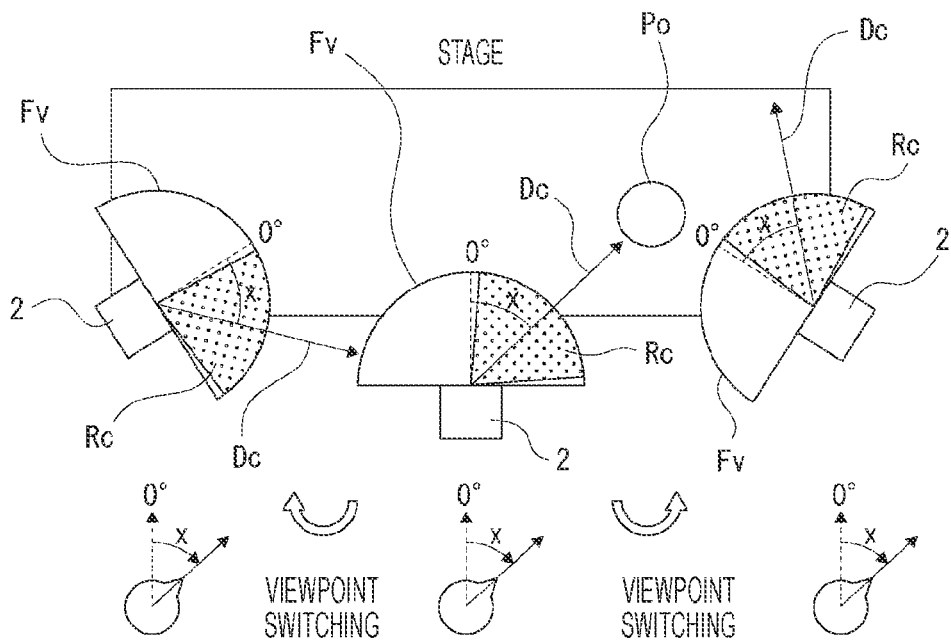
FIG. 4 is a consideration diagram about a display range deciding technique after viewpoint switching.

For example, it is assumed that the display unit 13 displays an image captured by the front camera 2 in FIG. 4. It is also assumed that, at this time, the user deviates his or her line-of-sight direction rightward from the front direction (the direction of 0 degrees) as illustrated, in order to catch the specific object (the artist in the present example) who is at the relatively right side on the stage, in front of his or her sight (i.e., at the center of the display image). A deviation amount of the line-of-sight direction from the front direction at this time is defined as x degrees.

Note that, in the following, the position of the specific object on the stage is represented as a position Po as illustrated.

It is assumed that viewpoint switching to, for example, the left camera 2 is made from the foregoing state. Since the line-of-sight direction of the user is deviated rightward by x degrees from the front direction, the display image after the viewpoint switching corresponds to an image cut with the direction deviated rightward by x degrees from the front direction in the field of view Fv of the left camera 2 set at the cutting direction Dc.

On the other hand, if the viewpoint switching to the right camera 2 is made, since the line-of-sight direction of the user before the viewpoint switching is also deviated rightward by x degrees from the front direction, the display image after the viewpoint switching corresponds to an image cut with a direction deviated rightward by x degrees from the front direction in the field of view Fv of the right camera 2 set at the cutting direction Dc.

As is clear by reference to the cutting direction Dc as to each of the left camera 2 and the right camera 2, under the ordinary line-of-sight following control, after the viewpoint switching, the user sometimes sees a target different from a target which the user has looked before the viewpoint switching. As a result, there is a possibility that a target to be caught in the display image considerably differs before and after the viewpoint switching. Therefore, there is a possibility that the user feels a sense of incongruity at the viewpoint switching.

Hence, the present embodiment proposes, as a display range deciding technique in viewpoint switching, the following deciding technique that does not make a decision on a display range, based on only information of a line-of-sight direction of a user like the ordinary line-of-sight following control, but makes a decision on a display range, using object position information of a specific object and camera position information.

Figure 5:
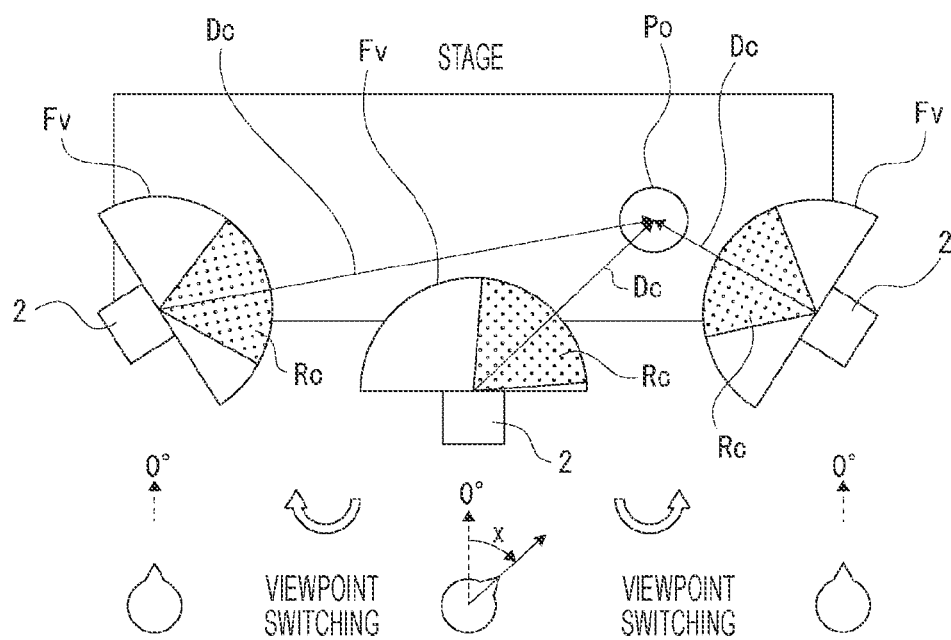
FIG. 5 is an explanatory diagram about a display range deciding technique as pattern 1 in the embodiment.

FIG. 5 is an explanatory diagram about a display range deciding technique as pattern 1.

According to pattern 1, a display range of a camera captured image of a switching destination viewpoint is decided such that the specific object is displayed in the line-of-sight direction of the user in the state in which the line-of-sight direction of the user is the front direction. That is, after the viewpoint switching, if the line-of-sight direction of the user is directed to the front direction, the user is able to see the specific object in front of his or her sight (i.e., at the center of the display image).

Such pattern 1 can be represented as a pattern for deciding the display range of the switching destination viewpoint image such that the specific object is displayed in the front direction of the line-of-sight direction of the user. It can be said that "the front direction of the line-of-sight direction of the user" as mentioned herein is regarded as a front direction defined with regard to a line-of-sight direction of a user.

Note that the exemplary case where the display range is decided such that the specific object is displayed in the front direction of the line-of-sight direction of the user is described here; however, it is not essential to cause the position where the specific object is displayed to strictly conform to the front direction of the line-of-sight direction of the user as long as the position can be regarded as being in the front direction. Alternatively, the position where the specific object is displayed is not limited to a position in the front direction of the line-of-sight direction of the user. It is sufficient that the position is, for example, in a predetermined direction such as a direction deviating from the front direction by a predetermined angle. With this configuration, after the viewpoint switching, if the user directs the line-of-sight direction to the predetermined direction, the user is able to see the object, which the user has looked before the viewpoint switching, in front. That is, by bringing about the state in which the line-of-sight direction is directed to the preset predetermined direction, the user is able to see the object, which the user has looked before the viewpoint switching, in front. It is therefore possible to cause the user to less feel a sense of incongruity owing to the viewpoint switching.

Here, the specific object which is present at the position Po in the present example is the object which the user has looked in the display image of the switching source viewpoint. According to pattern 1 of the present example (the same applies to pattern 2 to be described later), a display range of a camera captured image of a switching destination viewpoint is decided using the specific object which the user has looked in a display image from a switching source viewpoint, as the point of reference.

Figure 6:
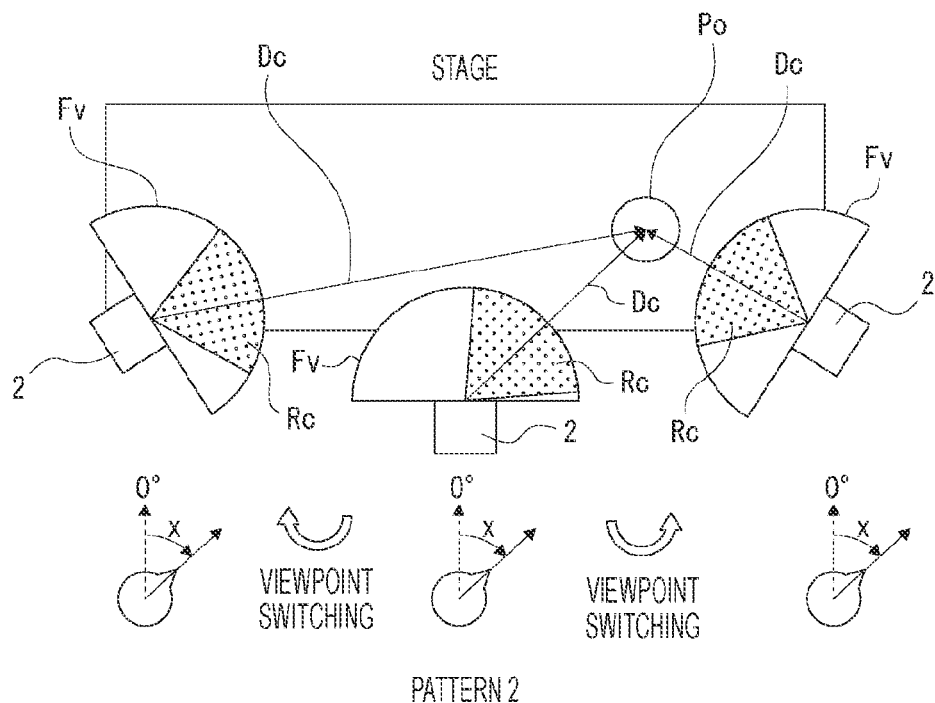
FIG. 6 is an explanatory diagram about the display range deciding technique as pattern 2 in the embodiment.

FIG. 6 is an explanatory diagram about the display range deciding technique as pattern 2.

According to pattern 2, a display range of a camera captured image of a switching destination viewpoint is decided such that the specific object is displayed on an extension of the line-of-sight direction of the user in a state in which the line-of-sight direction of the user conforms to the line-of-sight direction at the viewpoint switching. That is, after the viewpoint switching, the user is able to see the specific object in front of his or her sight while keeping the line-of-sight direction at the viewpoint switching. Such pattern 2 can be represented as a pattern for deciding the display range of the switching destination viewpoint image such that the specific target is displayed in the line-of-sight direction of the user at the viewpoint switching.

Figure 7:
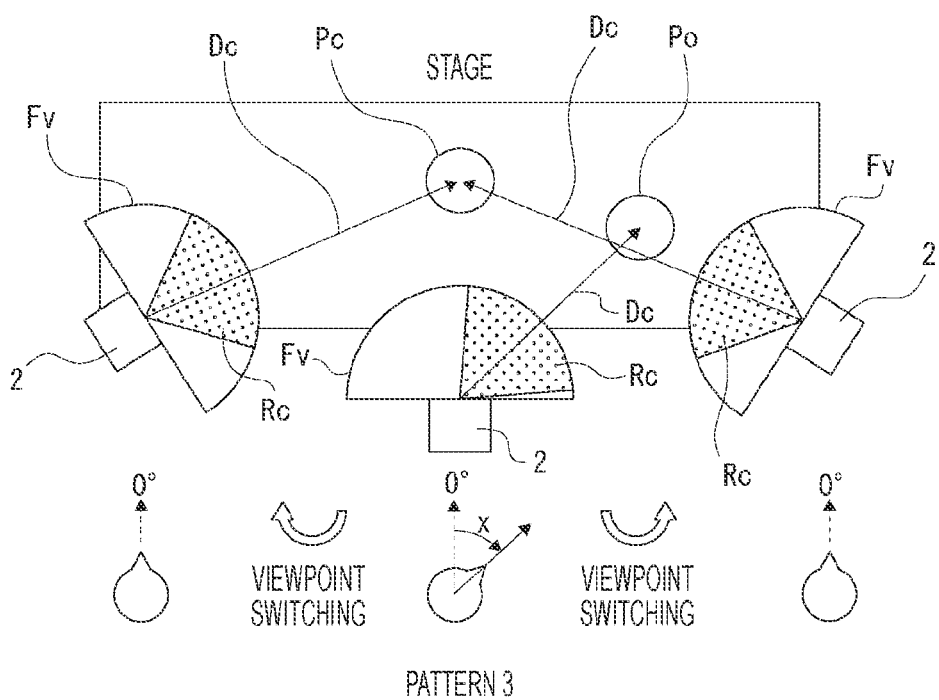
FIG. 7 is an explanatory diagram about the display range deciding technique as pattern 3 in the embodiment.

FIG. 7 is an explanatory diagram about the display range deciding technique as pattern 3.

Pattern 3 is a technique similar to pattern 1, and the display range of the camera captured image of the switching destination viewpoint is decided such that a specific space in the display target is displayed on an extension of the line-of-sight direction of the user in the state in which the line-of-sight direction of the user is the front direction. Here, in the present example, the specific space corresponds to the center of the stage. In the figure, the central position of the stage is illustrated as a position Pc.

It is considered herein that the control unit 12 acquires information of the position Pc from, for example, the communication apparatus 3 via the server apparatus 4.

As described above using patterns 1 to 3, according to the display range deciding technique of the embodiment, a display range is decided using a position of a specific object or specific space in a display target as the point of reference.

Therefore, in making a display range decision of the embodiment, the object position information of a specific object is used.

In addition, with regard to the camera 2 as the switching destination viewpoint, in making the display range decision using the position of the specific object or specific space as the point of reference, it is necessary to grasp a direction in which the specific object or the specific space is present, in the field of view Fv of the camera 2 as the switching destination viewpoint. For this reason, in making the display range decision of the embodiment, the camera position information on the camera 2 as the switching destination viewpoint is used.

Next, consideration will be given to viewpoint following control in a case where a display range decision is made in accordance with patterns 1 to 3 described above.

Figure 8:
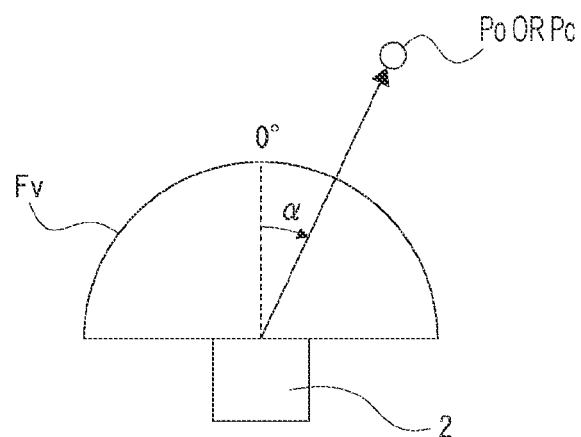
FIG. 8 is a consideration diagram about viewpoint following control in the case of patterns 1 and 3 in the embodiment.

FIG. 8 is a consideration diagram about viewpoint following control in the case of patterns 1 and 3.

As described above, in making the display range decision using the position of the specific object or specific space as the point of reference, it is necessary to grasp a direction in which the specific object or the specific space is present, in the field of view Fv of the camera 2 as the switching destination viewpoint. In FIG. 8, "angle $\alpha$" represents an angle of a direction in which the specific object (position Po) or the specific space (position Pc) is present, in the field of view Fv of the camera 2 as the switching destination viewpoint.

This angle $\alpha$ can be obtained on the basis of the camera position information on the camera 2 as the switching destination viewpoint and the object position information of the specific object or the position information of the specific space.

It is sufficient in patterns 1 and 3 that the specific object or the specific space is displayed at the center of the display image in the state in which the line-of-sight direction is the direction of 0 degrees. In other words, it is sufficient that the direction of a degrees is set at the cutting direction Dc in the state in which the line-of-sight direction is the direction of 0 degrees. It is therefore sufficient that, according to the line-of-sight following control in the case of patterns 1 and 3, a direction to be specified with an angle obtained by adding an offset based on the angle $\alpha$ to an angle of the line-of-sight direction estimated by the line-of-sight direction estimation unit 14 is decided as the cutting direction Dc.

Figure 9:
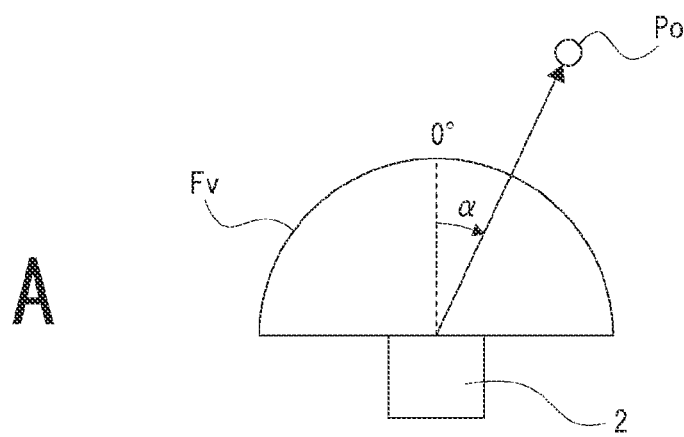
FIG. 9 is a consideration diagram about viewpoint following control in the case of pattern 2 in the embodiment.
Figure 9:
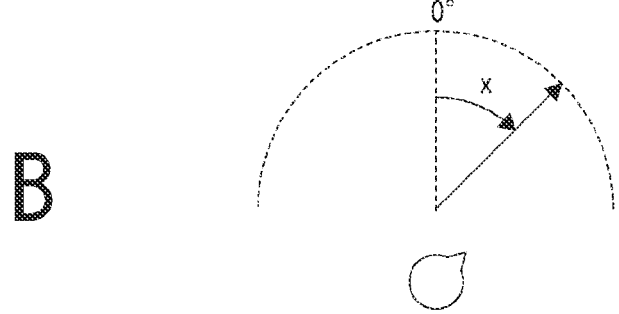

FIG. 9 is a consideration diagram about viewpoint following control in the case of pattern 2.

According to pattern 2, the display range decision is made using the position of the specific object as the point of reference. As illustrated in FIG. 9A, therefore, an angle $\alpha$ is used, which is an angle of a direction in which the specific object (position Po) is present in the field of view Fv of the camera 2 as the switching destination viewpoint. According to pattern 2, moreover, the display range is decided such that the specific object is displayed on the extension of the line-of-sight direction of the user in the state in which the line-of-sight direction of the user conforms to the line-of-sight direction at the viewpoint switching. For the viewpoint following control, therefore, an angle x is also used, which indicates the line-of-sight direction at the viewpoint switching illustrated in FIG. 9B.

It is sufficient in pattern 2 that a direction of a degrees is set at the cutting direction Dc in the state in which the line-of-sight direction of the user is a direction of the angle x. It is therefore sufficient that, according to the line-of-sight following control in the case of pattern 2, a direction to be specified with an angle obtained by adding an offset represented by "$\alpha$-x" to an angle of the line-of-sight direction estimated by the line-of-sight direction estimation unit 14 is decided as the cutting direction Dc.

3. Processing Procedure

With reference to a flowchart of FIG. 10, next, a description will be given of a specific processing procedure for achieving the display range deciding technique described above as the embodiment.

Figure 10:
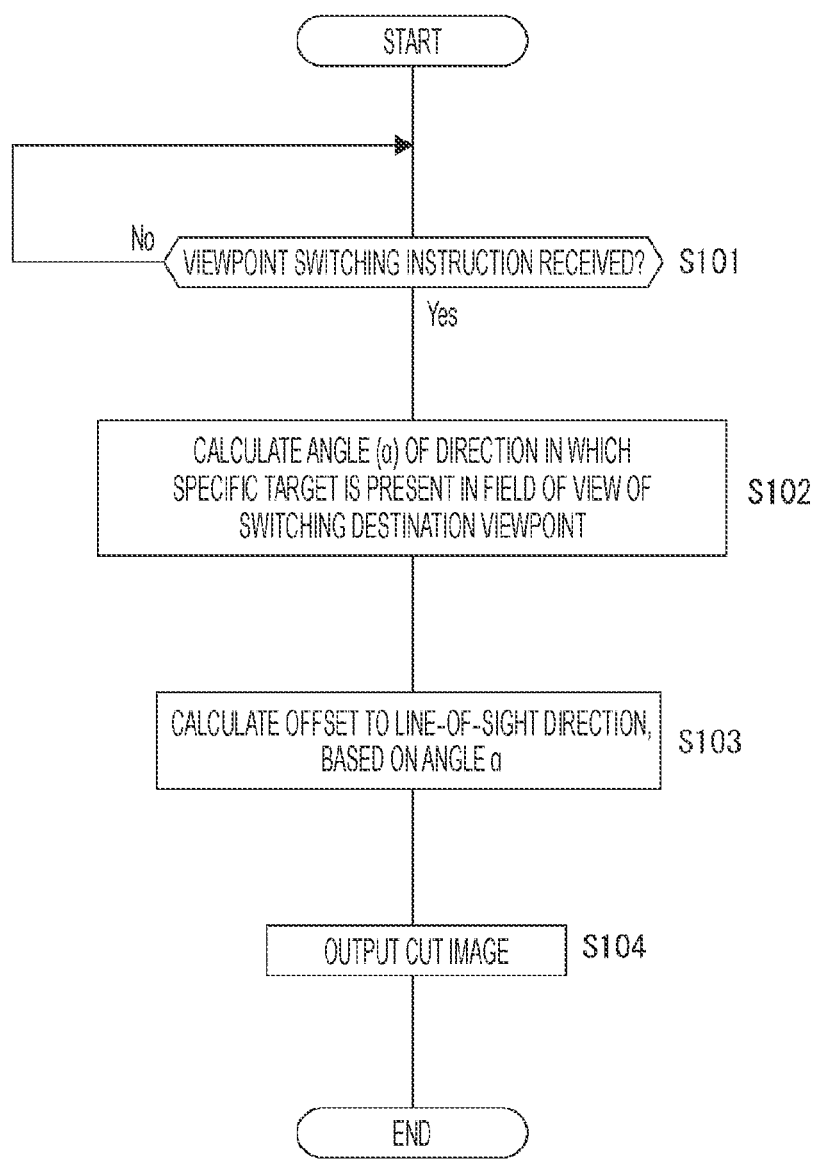
FIG. 10 is a flowchart illustrating an example of a specific processing procedure to be executed for achieving the display range deciding technique as the embodiment.

In the present example, processing illustrated in FIG. 10 is executed by the control unit 12 on the basis of a program stored in, for example, a predetermined storage apparatus such as a ROM.

In step S101, first, the control unit 12 waits for a viewpoint switching instruction. As this viewpoint switching instruction, for example, the control unit 12 waits for a viewpoint switching instruction which the user issues to the reproduction apparatus 1 through operation to the operation unit 15. It is assumed that this viewpoint switching instruction also contains the information of the switching destination viewpoint.

Note that the viewpoint switching is not necessarily executed on the basis of user's operation. It is also considered that the viewpoint switching is executed in accordance with establishment of a predetermined condition other than the operation. For example, the viewpoint switching is executed on the basis of switching instruction information added to a camera captured image or is executed in specific scene switching on the basis of a scene analysis result of a camera captured image.

In a case where the control unit 12 receives the viewpoint switching instruction, the processing proceeds to step S102 in which the control unit 12 calculates an angle $\alpha$ of a direction in which the specific target is present in the field of view Fv of a switching destination viewpoint.

In the case of adopting the display range deciding technique according to patterns 1 and 2, in step S102, the control unit 12 calculates an angle $\alpha$ of a direction in which the specific object is present in the field of view Fv of the camera 2 as the switching destination viewpoint. In the case of adopting the display range deciding technique according to pattern 3, in step S102, the control unit 12 calculates an angle $\alpha$ of a direction in which the specific space is present in the field of view Fv of the camera 2 as the switching destination viewpoint.

In calculating this angle $\alpha$, the control unit 12 uses the camera position information of the switching destination viewpoint, and the object position information of the specific object or the position information of the specific space.

In step S103 subsequent to step S102, the control unit 12 calculates an offset to a viewpoint direction on the basis of the angle $\alpha$. In the case of adopting the display range deciding technique according to patterns 1 and 3, in step S103, an offset is obtained by adding the angle $\alpha$ to the angle of the line-of-sight direction estimated by the line-of-sight direction estimation unit 14. On the other hand, in the case of adopting the display range deciding technique according to pattern 2, in step S103, the control unit 12 calculates an offset represented by "$\alpha$-x", on the basis of the angle $\alpha$ and the angle x of the line-of-sight direction at the viewpoint switching.

In step S104 subsequent to step S103, the control unit 12 performs cut image output processing. That is, the control unit 12 decides, as a cutting direction Dc, a direction that is specified with an angle obtained by adding the offset obtained in step S102 to the angle of the line-of-sight direction estimated by the line-of-sight direction estimation unit 14, and then cuts an image in a predetermined range about the cutting direction Dc, from a camera captured image of the switching destination viewpoint. The control unit 12 then outputs the cut image to the display unit 13.

The control unit 12 ends a series of processing illustrated in FIG. 10 in accordance with execution of processing in step S104.

Note that in the case of adopting patterns 1 and 2, in a case where the position of the specific object is moved, the control unit 12 successively recalculates the angle α on the basis of the object position information of the specific object and successively updates a value of the offset to be added to the angle of the line-of-sight direction.

4. Modifications

The embodiment is not limited to the foregoing specific example, and may adopt a variety of configurations as modifications.

For example, a determination whether or not the display range decision as the embodiment exemplified as patterns 1, 2, and 3 is made can be made on the basis of a type of a target which the user has looked in the display image of the switching source viewpoint.

Figure 11:
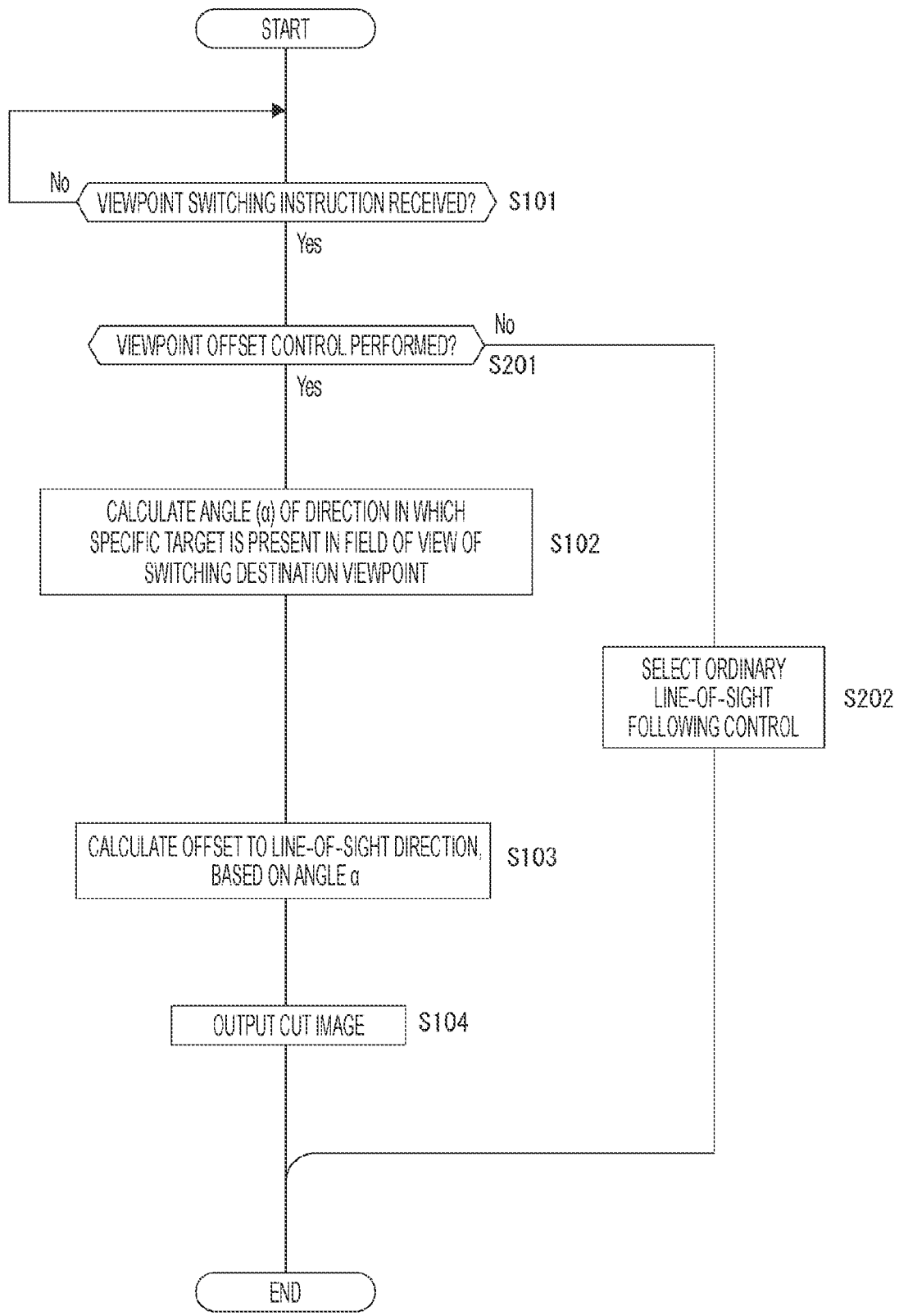
FIG. 11 is a flowchart illustrating processing as a modification.

FIG. 11 is a flowchart illustrating processing as a modification for making a determination whether or not a display range decision as the embodiment as described above is made.

Note that processing similar to the processing described with reference to FIG. 10 is denoted by the same reference sign in FIG. 11; therefore, the redundant description will not be given here.

In this case, in a case where the control unit 12 determines in step S101 that the control unit 12 receives a viewpoint switching instruction, the processing proceeds to step S201 in which the control unit 12 determines whether or not to perform line-of-sight offset control. Specifically, the determination is a determination whether or not a display range decision is made using three pieces of information, that is, the camera position information of the switching destination viewpoint, the position information of the specific target, and the information of the line-of-sight direction estimated by the line-of-sight direction estimation unit 14, as exemplified as patterns 1, 2, and 3. As this determination processing in step S201, the control unit 12 makes a determination based on a type of the target which the user has looked in the display image of the switching source viewpoint. Specifically, in the present example, the control unit 12 determines whether or not the target which the user has looked in the display image of the switching source viewpoint is the specific object (the artist in the present example).

Here, the determination whether or not the user has looked the specific object in the display image of the switching source viewpoint can be made by image analysis on the display image. Alternatively, the determination whether or not the specific object is located within the field of view Fv of the camera 2 as the switching source viewpoint may be made on the basis of the camera position information of the switching source viewpoint and the object position information of the specific object. At this time, the determination whether or not the user has looked the specific object can be made under a condition that the specific object has an image size equal to or more than a predetermined size or a condition that the specific object is in a certain range within the field of view Fv (e.g., a center range within the field of view Fv), in addition to the condition that the specific object is simply located in the switching source viewpoint image and a condition that the specific object is located in the field of view Fv of the switching source.

In a case where the target which the user has looked in the display image of the switching source viewpoint is the specific object in step S201, the control unit 12 obtains a result of the determination that the line-of-sight offset control is performed. In this case, the control unit 12 performs processing in step S102. The control unit 12 thus performs processing for the display range decision as the embodiment exemplified as patterns 1, 2, and 3.

On the other hand, in a case where the target which the user has looked in the display image of the switching source viewpoint is not the specific object in step S201, the control unit 12 obtains a result of the determination that the line-of-sight offset control is not performed. In this case, the control unit 12 performs processing in step S202 to select ordinary line-of-sight following control.

Through the processing described above, it is possible to prevent the user from feeling a sense of incongruity owing to viewpoint switching by indiscriminately making a display range decision using the three pieces of information.

Note that a technique of determining whether or not a display range decision as the embodiment is made, on the basis of a type of the target which the user has looked in the display image of the switching source viewpoint is not limited to the technique of determining whether or not the user has looked the specific object as described above. For example, a technique can also be adopted, which determines that a display range decision as the embodiment is not made when the user has looked a target outside the stage, such as a spectator seat portion.

Here, the above description concerns an HMD as an example of the reproduction apparatus 1; however, an apparatus form of the reproduction apparatus 1 is not limited to an HMD. For example, apparatus forms such as a smartphone, a tablet terminal, and a large display apparatus such as a television (TV) receiver are also conceivable. For example, in a case of a portable apparatus form such as a smartphone or a tablet terminal, the line-of-sight direction of the user can be estimated as an orientation of an apparatus. The orientation of the apparatus can be detected by, for example, a physical sensor such as an acceleration sensor or a gyro sensor.

Moreover, in a case of a stationary apparatus form such as a large display apparatus such as a television(TV) receiver, the line-of-sight direction of the user can be estimated by eye tracking.

Moreover, the above description has been given on the assumption that the orientation of each camera 2 is fixed. In a case where a change in orientation of each camera is allowed, a display range decision as to a switching destination viewpoint image uses not only position information of each camera 2 as a switching destination viewpoint, but also information of an orientation of the camera 2 (pan, tilt, and roll directions). The orientation information of each camera 2 can be detected by, for example, an acceleration sensor, a gyro sensor, or the like provided to the camera 2. Alternatively, the orientation information of each camera 2 can also be detected by calibration using a board on which predetermined graphics are drawn. It can be said herein that the orientation information of each camera 2 is regarded as a line-of-sight direction from a viewpoint.

Furthermore, the above description concerns the viewpoint switching and the display range decision mainly in the pan direction (lateral direction). Also in the tilt direction, viewpoint switching and a display range decision can be made by the similar technique. In the case of the tilt direction, it is also considered that information of a posture and orientation of a specific object is used in addition to position information of the specific object. For example, in a case where it is desired to catch the front of the face of the artist which is the specific object, the information of the posture and orientation of the specific object is used for the display range decision.

Moreover, the above description mentions the example of the sensor that detects the position of the specific object. Alternatively, in a case where a display target is, for example, a classical concert or the like and a seating position of an artist is a preset fixed position, information of the preset fixed position can be used.

It is also considered that a display range deciding technique is switched depending on an apparatus type of the reproduction apparatus 1. For example, it is considered that a display range after viewpoint switching is changed depending on whether the reproduction apparatus 1 is an HMD or another display device (e.g., a tablet terminal, a TV receiver). Specifically, when a specific object is located near an end of an image from a switching destination viewpoint, in a case of an HMD, the specific object is viewed with ease in such a manner that the specific object is located at the center of a display image. In a case of a tablet terminal or the like, on the other hand, it is not desirable that the end is filled with a predetermined color such as black as a non-image portion. It is therefore considered that the display range is decided such that an end of a display image frame conforms to the end of the image from the switching destination viewpoint.

Moreover, the above description mentions the example of the specific object or specific space which is an object or space on a real space. Alternatively, the display range deciding technique as the embodiment is also preferably applicable to a case where a display target is an object or a space in a virtual space such as a virtual reality (VR) space or an augmented reality (AR) space.

5. Program

The above description concerns the information processing apparatus (the reproduction apparatus 1) as the embodiment. A program of an embodiment is a program for causing a computer apparatus such as a CPU to execute the processing as the reproduction apparatus 1.

The program of the embodiment is a computer apparatus-readable program for causing a computer apparatus to execute processing, in switching a display image as to multiple-viewpoint images capable of displaying a display target from multiple viewpoints, from a switching source viewpoint image corresponding to a switching source viewpoint to a switching destination viewpoint image corresponding to a switching destination viewpoint, of deciding a display range of the switching destination viewpoint image on the basis of viewpoint position information of the switching destination viewpoint, specific target information which is information regarding a specific target in the display target, and line-of-sight direction information of an estimated orientation of a line-of-sight of a user to the display image.

That is, this program corresponds to, for example, a program for causing a computer apparatus to execute the processing described with reference to FIG. 10, FIG. 11, or the like.

Such a program can be previously stored in, for example, a computer apparatus-readable storage medium such as a ROM, a hard disk drive (HDD), or a solid state drive (SSD). Alternatively, such a program can also be temporarily or permanently held (stored) in a removable storage medium such as a semiconductor memory, a memory card, an optical disk, a magneto-optical disk, or a magnetic disk. Moreover, such a removable storage medium can be provided in the form of packaged software.

Moreover, such a program can be installed in a personal computer or the like from a removable storage medium or can also be downloaded from a download site onto a desired information processing apparatus such as a smartphone via a network such as a LAN or the Internet.

6. Summary of Embodiment

As described above, an information processing apparatus (a reproduction apparatus 1) as an embodiment includes a display range decision unit (a control unit 12) configured, in switching a display image as to multiple-viewpoint images capable of displaying a display target from multiple viewpoints, from a switching source viewpoint image corresponding to a switching source viewpoint to a switching destination viewpoint image corresponding to a switching destination viewpoint, to decide a display range of the switching destination viewpoint image on the basis of viewpoint position information of the switching destination viewpoint, specific target information which is information regarding a specific target in the display target, and line-of-sight direction information of an estimated orientation of a line-of-sight of a user to the display image.

Here, if the display target is, for example, a target in a real space, a viewpoint to the display target is a viewpoint of a camera that captures an image of the target. Alternatively, if the display target is a target in a virtual space, a viewpoint to the display target is a viewpoint to the display target set on the virtual space. Moreover, the specific target information is information regarding the specific target in the display target. For example, if the display target is a music live show or the like in a real space, the specific target information can be information of a position, posture, and orientation of a specific object such as an artist on a stage, information of a position of a specific space in the display target, such as the center of the stage, and the like, as examples.

According to the foregoing configuration, in a case where a display range of an image is controlled in accordance with a line-of-sight direction of a user, a display range of a switching destination viewpoint image can be decided on the basis of the relationship between a position of a switching destination viewpoint and a position and the like of a specific target in a display target.

It is therefore possible to prevent a target to be caught in a display image from considerably differing before and after viewpoint switching and to cause a user to less feel a sense of incongruity owing to viewpoint switching.

Moreover, in the information processing apparatus as the embodiment, the specific target information is information containing a position of the specific target.

With this configuration, it is possible to decide the display range of the switching destination viewpoint image on the basis of the relationship between the position of the switching destination viewpoint and the position of the specific target.

It is therefore possible to prevent a target to be caught in a display image from considerably differing before and after viewpoint switching and to cause a user to less feel a sense of incongruity owing to viewpoint switching.

Moreover, in the information processing apparatus as the embodiment, the position of the specific target is detected by image analysis.

With this configuration, it is possible to eliminate a necessity to attach a position detection sensor to the specific target in detecting the position of the specific target.

It is accordingly possible, in a case where the specific target is, for example, a specific object such as an artist on a stage, to omit time and effort for attaching a sensor to the specific object.

Moreover, in the information processing apparatus as the embodiment, the position of the specific target is detected on the basis of a detection signal of a sensor attached to the specific target.

With this configuration, it is possible to eliminate a necessity to perform image analysis processing for detecting a position of the specific target.

It is therefore possible to reduce a processing burden in detecting the position of a specific target.

Furthermore, in the information processing apparatus as the embodiment, the display range decision unit decides the display range, using information of a direction of a line-of-sight from the switching destination viewpoint.

With this configuration, it is possible to address a case where a direction of a line-of-sight from a viewpoint is changeable such as a case where an orientation of a camera that captures an image of a display target is changeable.

It is therefore possible to permit a change in view angle of a display target from a viewpoint and to improve the degree of freedom as to image contents to be displayed to a user.

Moreover, in the information processing apparatus as the embodiment, the display range decision unit decides the display range such that the specific target is displayed in a predetermined direction of a line-of-sight direction of the user (see patterns 1 and 3).

With this configuration, after the viewpoint switching, the user is able to see the specific target in the predetermined direction by directing his or her line-of-sight direction to the predetermined direction.

It is therefore possible to cause the user to less feel a sense of incongruity owing to the viewpoint switching.

Moreover, in the information processing apparatus as the embodiment, the display range decision unit decides the display range such that the specific target is displayed in a front direction of a line-of-sight direction of the user (see patterns 1 and 3).

With this configuration, after the viewpoint switching, the user is able to see the specific target in front by directing his or her line-of-sight direction to the front direction.

It is therefore possible to cause the user to less feel a sense of incongruity owing to the viewpoint switching.

Furthermore, in the information processing apparatus as the embodiment, the specific target is a specific space in the display target (see pattern 3).

With this configuration, it is possible to decide the display range of the switching destination viewpoint image, using, for example, a space serving as an indication in the display target, such as the center of the stage, as the point of reference.

It is therefore possible to prevent a position, which the user has seen, in the display target from being lost after the viewpoint switching and to cause the user to less feel a sense of incongruity owing to the viewpoint switching.

Moreover, in the information processing apparatus as the embodiment, the display range decision unit decides the display range such that the specific target is displayed in a line-of-sight direction of the user at the viewpoint switching (see pattern 2).

With this configuration, after the viewpoint switching, the user is able to see the specific target in front while keeping the line-of-sight direction at the viewpoint switching.

It is therefore possible to prevent a position, which the user has seen, in the display target from being lost after the viewpoint switching and to cause the user to less feel a sense of incongruity owing to the viewpoint switching.

Further, in the information processing apparatus as the embodiment, the specific target is an object determined that the user has looked in the display image of the switching source viewpoint.

With this configuration, it is possible to decide the display range of the switching destination viewpoint image, using the object which the user has looked in the display image of the switching source viewpoint, as the point of reference.

It is therefore possible to cause the object, which the user has successively looked even after the viewpoint switching, to be caught in the display image and to cause the user to less feel a sense of incongruity owing to the viewpoint switching.

Furthermore, in the information processing apparatus as the embodiment, the display range decision unit determines whether or not to make a decision on the display range using the viewpoint position information, the specific target information, and the line-of-sight direction information, on the basis of a type of the target which the user has looked in the display image of the switching source viewpoint.

With this configuration, it is possible to make an appropriate determination whether or not to make a display range decision using the viewpoint position information, the specific target information, and the line-of-sight direction information, on the basis of a type of the target which the user has looked. For example, when the user has looked a target outside the stage, such as a spectator seat portion, the display range decision unit determines not to make a display range decision using the foregoing three pieces of information.

It is therefore possible to prevent the user from feeling a sense of incongruity owing to the viewpoint switching by indiscriminately making a display range decision using the three pieces of information.

Moreover, in the information processing apparatus as the embodiment, in a case where it is determined that the user has looked the specific object in the display image of the switching source viewpoint, the display range decision unit makes a decision on the display range using the viewpoint position information, the specific target information, and the line-of-sight direction information (see FIG. 11).

With this configuration, in a case where the user has looked, for example, a target different from the specific object, such as a spectator seat portion, it is possible not to make a display range decision using the three pieces of information.

It is therefore possible to prevent the user from feeling a sense of incongruity owing to the viewpoint switching by indiscriminately making a display range decision using the three pieces of information.

In addition, a display range decision method as the embodiment is a display range decision method including causing an information processing apparatus, in switching a display image as to multiple-viewpoint images capable of displaying a display target from multiple viewpoints, from a switching source viewpoint image corresponding to a switching source viewpoint to a switching destination viewpoint image corresponding to a switching destination viewpoint, to decide a display range of the switching destination viewpoint image on the basis of viewpoint position information of the switching destination viewpoint, specific target information which is information regarding a specific target in the display target, and line-of-sight direction information of an estimated orientation of a line-of-sight of a user to the display image.

Such a display range decision method is also capable of providing functional effects similar to those of the foregoing information processing apparatus as the embodiment.

Note that the advantageous effects described in the present specification are merely exemplary and not limitative, and there may be achieved other advantageous effects.

7. The Present Technology

Note that the present technology can also adopt the following configurations.

(1)

An information processing apparatus including a display range decision unit configured, in switching a display image as to multiple-viewpoint images capable of displaying a display target from multiple viewpoints, from a switching source viewpoint image corresponding to a switching source viewpoint to a switching destination viewpoint image corresponding to a switching destination viewpoint, to decide a display range of the switching destination viewpoint image on the basis of viewpoint position information of the switching destination viewpoint, specific target information which is information regarding a specific target in the display target, and line-of-sight direction information of an estimated orientation of a line-of-sight of a user to the display image.

(2)

The information processing apparatus as recited in (1), in which the specific target information is information containing a position of the specific target.

(3)

The information processing apparatus as recited in (2), in which the position of the specific target is detected by image analysis.

(4)

The information processing apparatus as recited in (2) or (3), in which the position of the specific target is detected on the basis of a detection signal of a sensor attached to the specific target.

(5)

The information processing apparatus as recited in any of (1) to (4), in which the display range decision unit decides the display range, using information of a direction of a line-of-sight from the switching destination viewpoint.

(6)

The information processing apparatus as recited in any of (1) to (5), in which the display range decision unit decides the display range such that the specific target is displayed in a predetermined direction of a line-of-sight direction of the user.

(7)

The information processing apparatus as recited in (5), in which the display range decision unit decides the display range such that the specific target is displayed in a front direction of a line-of-sight direction of the user.

(8)

The information processing apparatus as recited in (6) or (7), in which the specific target is a specific space in the display target.

(9)

The information processing apparatus as recited in any of (1) to (5), in which the display range decision unit decides the display range such that the specific target is displayed in a line-of-sight direction of the user at viewpoint switching.

(10)

The information processing apparatus as recited in any of (1) to (7) and (9), in which the specific target is an object determined that the user has looked in the display image of the switching source viewpoint.

(11)

The information processing apparatus as recited in any of (1) to (10), in which the display range decision unit determines whether or not to make a decision on the display range using the viewpoint position information, the specific target information, and the line-of-sight direction information, on the basis of a type of the target which the user has looked in the display image of the switching source viewpoint.

(12)

The information processing apparatus as recited in (11), in which in a case where it is determined that the user has looked the specific object in the display image of the switching source viewpoint, the display range decision unit makes a decision on the display range using the viewpoint position information, the specific target information, and the line-of-sight direction information.

(13)

A display range decision method including causing an information processing apparatus, in switching a display image as to multiple-viewpoint images capable of displaying a display target from multiple viewpoints, from a switching source viewpoint image corresponding to a switching source viewpoint to a switching destination viewpoint image corresponding to a switching destination viewpoint, to decide a display range of the switching destination viewpoint image on the basis of viewpoint position information of the switching destination viewpoint, specific target information which is information regarding a specific target in the display target, and line-of-sight direction information of an estimated orientation of a line-of-sight of a user to the display image.

(14)

A computer apparatus-readable program for causing a computer apparatus to execute processing, in switching a display image as to multiple-viewpoint images capable of displaying a display target from multiple viewpoints, from a switching source viewpoint image corresponding to a switching source viewpoint to a switching destination viewpoint image corresponding to a switching destination viewpoint, of deciding a display range of the switching destination viewpoint image on the basis of viewpoint position information of the switching destination viewpoint, specific target information which is information regarding a specific target in the display target, and line-of-sight direction information of an estimated orientation of a line-of-sight of a user to the display image.

REFERENCE SIGNS LIST

1 Reproduction apparatus
2 Camera
3 Communication apparatus
4 Server apparatus
15 NT Network
11 Communication unit
12 Control unit
13 Display unit
14 Line-of-sight direction estimation unit
15 Operation unit
31 Object position detection unit
32 Control unit
33 Communication unit
Fv Field of view
Rc Cut range
Dc Cutting direction

The invention claimed is:

1. An information processing apparatus comprising circuitry configured to
decide a switching destination viewpoint image, in switching a display image among multiple-viewpoint images configured to display a display target from multiple viewpoints, from a switching source viewpoint image corresponding to a switching source viewpoint to the switching destination viewpoint image corresponding to a switching destination viewpoint, and
initiate display of the switching destination viewpoint image with the decided display range,
wherein the circuitry decides the display range of the switching destination viewpoint image based on viewpoint position information of the switching destination viewpoint, specific target information comprising information regarding a specific target in the display target, and line-of-sight direction information of an estimated orientation of a line-of-sight of a user with respect to the display image.

2. The information processing apparatus according to claim 1, wherein
the specific target information comprises information containing a position of the specific target.

3. The information processing apparatus according to claim 2, wherein
the position of the specific target is detected by image analysis.

4. The information processing apparatus according to claim 2, wherein
the position of the specific target is detected based on a basis of a detection signal of a sensor attached to the specific target.

5. The information processing apparatus according to claim 1, wherein
the circuitry decides the display range, using information of a direction of a line-of-sight from the switching destination viewpoint.

6. The information processing apparatus according to claim 1, wherein
the circuitry decides the display range such that the specific target is displayed in a predetermined direction of a line-of-sight direction of the user.

7. The information processing apparatus according to claim 5, wherein
the circuitry decides the display range such that the specific target is displayed in a front direction of a line-of-sight direction of the user.

8. The information processing apparatus according to claim 6, wherein
the specific target comprises a specific space in the display target.

9. The information processing apparatus according to claim 1, wherein
the circuitry decides the display range such that the specific target is displayed in a line-of-sight direction of the user at viewpoint switching.

10. The information processing apparatus according to claim 1, wherein
the specific target comprises an object which is determined as the specific target when the user has looked at the object in the switching source viewpoint image.

11. The information processing apparatus according to claim 1, wherein
the circuitry is further configured to determine whether or not to decide the display range using the viewpoint position information, the specific target information, and the line-of-sight direction information, based on a type of the specific target at which the user has looked in the switching source viewpoint image.

12. The information processing apparatus according to claim 11, wherein
in a case where it is determined that the user has looked at the specific object in the switching source viewpoint image, the circuitry decides the display range using the viewpoint position information, the specific target information, and the line-of-sight direction information.

13. A display range decision method comprising:
causing an information processing apparatus to decide a display range of a switching destination viewpoint image, in switching a display image among multiple-viewpoint images configured to display a display target from multiple viewpoints, from a switching source viewpoint image corresponding to a switching source viewpoint to the switching destination viewpoint image corresponding to a switching destination viewpoint; and
displaying the switching destination viewpoint image with the decided display range,
wherein the information processing apparatus decides the display range of the switching destination viewpoint image based on viewpoint position information of the switching destination viewpoint, specific target information comprising information regarding a specific target in the display target, and line-of-sight direction information of an estimated orientation of a line-of-sight of a user with respect to the display image.

14. A non-transitory computer-readable storage medium having embodied thereon a program, which when executed by a computer causes the computer to execute method, the method comprising:
deciding a display range of a switching destination viewpoint image, in switching a display image among multiple-viewpoint images configured to display a display target from multiple viewpoints, from a switching source viewpoint image corresponding to a switching source viewpoint to the switching destination viewpoint image corresponding to a switching destination viewpoint; and
displaying the switching destination viewpoint image with the decided display range,
wherein the display range of the switching destination viewpoint image is decided based on viewpoint position information of the switching destination viewpoint, specific target information comprising information regarding a specific target in the display target, and line-of-sight direction information of an estimated orientation of a line-of-sight of a user with respect to the display image.

* * * * *